United States Patent [19]

Claar et al.

[11] Patent Number: 4,981,632
[45] Date of Patent: * Jan. 1, 1991

[54] PRODUCTION OF CERAMIC AND CERAMIC-METAL COMPOSITE ARTICLES INCORPORATING FILLER MATERIALS

[75] Inventors: Terry D. Claar, Newark, Del.; Steven D. Poste, Kingston, Canada; Adam J. Gesing, Kingston, Canada; Marek J. Sobczyk, Kingston, Canada; Narasimha S. Raghavan, Kingston, Canada; David K. Creber, Kingston, Canada; Alan S. Nagelberg, Wilmington, Del.

[73] Assignee: Lanxide Technology Company, LP, Newark, Del.

[*] Notice: The portion of the term of this patent subsequent to Apr. 25, 2006 has been disclaimed.

[21] Appl. No.: 168,285

[22] Filed: Mar. 15, 1988

Related U.S. Application Data

[63] Continuation-in-part of Ser. No. 907,927, Sep. 16, 1986, Pat. No. 4,824,625.

[51] Int. Cl.⁵ .................. C04B 33/32; C04B 35/60
[52] U.S. Cl. ......................... 264/60; 264/82; 264/125
[58] Field of Search ............ 264/60, 65, 82, 125, 264/126, 57, 59; 501/98, 127, 128

[56] References Cited

U.S. PATENT DOCUMENTS

| 2,741,822 | 4/1956 | Udy | 264/59 |
|---|---|---|---|
| 2,792,214 | 5/1957 | Eusner et al. | 266/43 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk | . |
| 3,789,096 | 1/1974 | Church | 264/60 |
| 3,864,154 | 2/1975 | Gazza | 29/123 B |
| 3,973,977 | 8/1976 | Wilson | 106/62 |
| 4,232,091 | 11/1980 | Grimshaw et al. | 428/472 |

FOREIGN PATENT DOCUMENTS

| 0115742 | 8/1984 | European Pat. Off. . |
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys. Reaction with Refractories" by M. Drouzy and M. Richard–Mar. 1974–Fonderie, France No. 332, pp. 121–128.

"Refractories for Aluminum Alloy Melting Furnaces" by B. Clavaud and V. Jost, Sep. 1980–Trans. Lillian Brassinga Jan. 1985.

Primary Examiner—James Derrington
Attorney, Agent, or Firm—Mark G. Mortenson; Michael K. Boyer; William E. McShane

[57] ABSTRACT

A method of producing a composite comprising a self-supporting polycrystalline material obtained by oxidation reaction of a molten parent metal with a vapor-phase oxidant comprising infiltrating a filler exhibiting inter-particle pore volume with a parent metal under conditions which control the respective rates of said metal infiltration and said oxidation reaction.

30 Claims, 3 Drawing Sheets

PRODUCTION OF CERAMIC AND CERAMIC-METAL COMPOSITE ARTICLES INCORPORATING FILLER MATERIALS

CROSS-REFERENCE TO RELATED APPLICATIONS

This application is a continuation-in-part of Commonly Owned and Copending U.S. patent application Ser. No. 907,927, filed Sept. 16, 1986, now U.S. Pat. No. 4,824,625 in the names of Claar, Poste, Gesing, Sobczyk, Raghavan, Creber and Nagelberg, and entitled "Production of Ceramic and Ceramic-Metal Composite Articles Incorporating Filler Materials".

FIELD OF THE INVENTION

The present invention broadly relates to novel composite structures and to novel methods of making the same. In particular, the invention relates to composite ceramic and ceramic-metal structures having a filler infiltrated by a polycrystalline matrix, and to methods of making the structures by the in situ oxidation reaction of a parent metal in the pore volume of permeable mass of filler material.

BACKGROUND OF THE INVENTION AND COMMONLY OWNED PATENT APPLICATIONS AND PATENTS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Nitride matrix ceramic articles, in particular, are of interest as potential candidates for applications requiring high strength at elevated temperatures such as, for example, components of automobile engines. Silicon nitride is an especially useful material in the latter respects. The cutting tool industry is another potentially important field of application for silicon nitride articles.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler materials such as particulates, fibers, rods, and the like.

There are several known limitations or difficulties in substituting ceramics for metals, such as scaling versatility, capability to produce complex shapes, satisfying the properties required for the end use application, and costs. Several copending U.S. patent applications assigned to the same owner as this application (hereinafter referred to as Commonly Owned Patent Applications), overcome these limitations or difficulties and provide novel methods for reliably producing ceramic materials, including composites. The method is disclosed generically in Commonly Owned Application Ser. No. 818,943, filed Jan. 15, 1986, now U.S. Pat. No. 4,713,360 which is a Continuation-in-Part of Ser. No. 776,964, filed Sept. 17, 1985, which is a Continuation-in-Part of Ser. No. 705,787, filed Feb. 26, 1985, which is a Continuation-in-Part of U.S. application Ser. No. 591,392, filed Mar. 16, 1984, all in the name of Marc S. Newkirk et al and entitled "Novel Ceramic Materials and Methods for Making the Same". These applications disclose the method of producing self-supporting ceramic bodies grown as the oxidation reaction product from a parent metal precursor. Molten metal is reacted with a vapor-phase oxidant to form an oxidation reaction product, and the metal migrates through the oxidation product toward the oxidant thereby continuously developing a ceramic polycrystalline body which can be produced having an interconnected metallic component. The process may be enhanced by the use of an alloyed dopant, such as is used in the case of oxidizing aluminum doped with magnesium and silicon for oxidation reaction in air to form alpha-alumina ceramic structures. This method was improved upon by the application of dopant materials to the surface of the precursor metal, as described in Commonly Owned patent applications Ser. No. 220,935, filed June 23, 1988, now U.S. Pat. No. 4,853,352 which is a continuation of Ser. No. 822,999, filed Jan. 27, 1986, which is a Continuation-in-Part of Ser. No. 776,965, filed Sept. 17, 1985, which is a Continuation-in-Part of Ser. No. 747,788, filed June 25, 1985, which is a Continuation-in-Part of Ser. No. 632,636, filed July 20, 1984, all in the name of Marc S. Newkirk et al and entitled "Methods of Making Self-Supporting Ceramic Materials".

This oxidation phenomenon was utilized in producing ceramic composite bodies as described in Commonly Owned patent application Ser. No. 819,397, filed Jan. 17, 1986, now U.S. Pat. No. 4,851,375 which is a Continuation-in-Part of Ser. No. 697,876, filed Feb. 4, 1985, both in the name of Marc S. Newkirk et al and entitled "Composite Ceramic Articles and Methods of Making Same". These applications disclose novel methods for producing a self-supporting ceramic composite by growing an oxidation reaction product from a parent metal precursor into a permeable mass of filler, thereby infiltrating the filler with a ceramic matrix. The resulting composite, however, has no defined or predetermined geometry, shape, or configuration.

A method for producing ceramic composite bodies having a predetermined geometry or shape is disclosed in the Commonly Owned patent application Ser. No. 338,471, filed Apr. 14, 1989, which is a continuation of Ser. No. 861,025, filed May 8, 1986. In accordance with the method in this U.S. patent application, the developing oxidation reaction product infiltrates a permeable preform in the direction towards a defined surface boundary. It was discovered that high fidelity is more readily achieved by providing the preform with a barrier means, as disclosed in Commonly Owned patent application Ser. No. 861,024, filed May 8, 1986 now allowed. This method produces shaped self-supporting ceramic bodies, including shaped ceramic composites, by growing the oxidation reaction product of a metal precursor to a barrier means spaced from the metal for establishing a boundary or surface. Ceramic composites having a cavity with an interior geometry inversely replicating the shape of a positive mold or pattern is disclosed in Commonly Owned and copending U.S. patent application Ser. No. 823,542, filed Jan. 27, 1986, now U.S. Pat. No. 4,824,785 and in U.S. patent application Ser. No. 896,157, filed Aug. 13, 1986 now allowed.

Common to each of these Commonly Owned Patent Applications and Patents is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or filler materials, etc. Although some of the metallic components may be isolated or enclosed, it is frequently the case that a substantial volume percent of metal will be interconnected and accessible from an external surface of the ceramic body. It has been observed for these ceramic bodies that this interconnected metal-containing component or constituent can range from about 1 to about 40 percent by volume, and sometimes higher. Such a metallic component can impart certain favorable properties to, or improve the performance of, the ceramic articles in many product applications. For example, the presence of metal in the ceramic structure may have a substantial benefit with respect to imparting fracture toughness, thermal conductivity, resilience or electrical conductivity to the ceramic body.

The entire disclosures of all of the foregoing Commonly Owned Patent Applications and Patents are expressly incorporated herein by reference.

The present invention discloses a method for producing polycrystalline composite structures whereby molten parent metal infiltrates a permeable mass of filler material and reacts in situ with a vapor-phase oxidant wherein the respective rates of metal infiltration and oxidation reaction are controlled such that reaction takes place in at least a portion of the infiltrated filler mass. By means of such control the relative proportions of oxidized and non-oxidized parent metal within the composite microstructure can be varied to obtain desired end-use properties.

The method of these inventions for producing ceramic articles overcome some of the traditional limitations or difficulties in producing ceramic articles as substitutes for metals in end-use applications.

DEFINITIONS

As used hereinafter in the specification and the appended claims, the terms below are defined as follows:

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, ammonia, methane, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

"Vapor-phase oxidant", which identifies the oxidation as containing or comprising a particular gas or vapor, means an oxidant in which the identified gas or vapor is the sole, predominant or at least a significant oxidizer of the metal environment utilized. For example, although the major constituent of air is nitrogen, the oxygen content of air is the sole oxidizer for the metal precursor because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

"Parent metal" refers to the metal which reacts with the vapor-phase oxidant to form the polycrystalline oxidation reaction product, and includes that metal as a relatively pure metal or a commercially available metal with impurities; and when a specified metal is mentioned as the parent metal, e.g. aluminum, the metal identified should be read with this definition in mind unless indicated otherwise by the context.

SUMMARY OF THE INVENTION

In accordance with the present invention, there is provided a method for producing a composite comprising a self-supporting polycrystalline material obtained by the oxidation reaction of a molten parent metal with a vapor-phase oxidant, comprising selecting a parent metal and heating said parent metal in an oxidizing atmosphere at a temperature above its melting point. The resulting molten metal body is contacted with a permeable mass of filler comprising discrete particles formed into a bed or rigid preform and exhibiting inter-particle pore volume. The temperature is maintained for a time sufficient to enable (i) infiltration of the filler by molten metal and (ii) oxidation reaction of the metal with the vapor-phase oxidant. Conditions are maintained which control the rates of metal infiltration and metal oxidation reaction such that the oxidation reaction between molten parent metal and oxidant takes place within at least a portion of the inter-particle pore volume of the infiltrated mass of filler. The oxidation reaction product thereby obtained together with the unoxidized portion, if any, of the parent metal provides a matrix for the filler particles in the composite so formed, which is then recovered as the end product.

The product of the oxidation reaction forms at the interface between the infiltrated molten metal and the vapor-phase oxidant locally within the filler mass. This product grows in two opposite directions; with respect to the orientation of said interface, namely "outward" into the vapor phase and "inward" into the molten metal. The "inward" growing reaction product is believed to dissolve in the molten metal. When saturation is achieved, the oxidation reaction product precipitates from the saturated solution.

Various means may be employed separately or together to control the rate of infiltration into the filler of the molten parent metal and the rate of oxidation of said metal into the filler.

In one preferred embodiment of the invention, the particle size of the filler and the porosity of the filler particles per se are predetermined to provide both the inter-particle pores in the filler bed and the intra-particle pores of the particles to control the total pore volume available within the mass of filler for infiltration by the molten metal and for permeation by the vapor-phase oxidant. In this embodiment, formation of the oxidation reaction product may take place in both the inter-particle and intra-particle pore volume by both outward growth into the vapor phase and inward growth into the molten metal phase. The small intra-particle porosity is preferentially filled by metal, and the formation of the reaction product is a result of the aforementioned precipitation within this metal.

In another embodiment, the rate of oxidation is controlled by partial pressure of the vapor-phase oxidant. The partial pressure may be reduced either by reduction of the ambient pressure or by dilution with an inert gas, for example argon. In still another embodiment, the rate of infiltration is controlled by applying hydrostatic pressure to the body of molten parent metal by any suitable method, for example, by the application of gas pressure to the molten metal surface.

The process may be enhanced by providing suitable means for wetting the filler media by the molten parent metal, as by use of a dopant source within the parent metal and/or the filler and disclosed in the Commonly Owned Patent Applications. Where desired, wetting may be enhanced by pretreatment of the filler material to remove oxygen and/or moisture occluded on the surface of the filler material.

A further aspect of the invention comprises a method of producing a polycrystalline composite having a nitride matrix by vapor-phase nitridation of a molten parent metal. The molten metal infiltrates a filler material, having controlled inter- and intra-particle porosity, positioned in the nitriding atmosphere. A nitriding medium that is substantially oxygen-free and moisture-free is provided by use of high purity nitrogen gas or reactive compound of nitrogen, e.g. ammonia. Also, pretreatment of the filler material may be desirable as, for example, by exposure to hydrogen gas to remove occluded surface oxides.

In a further aspect of the invention, a silicon nitride composite is produced from parent metal comprising silicon, optionally containing iron or copper as a dopant, a filler of silicon nitride, preferably pretreated as outlined hereinabove, and a nitridation medium of high purity nitrogen gas.

In yet a further embodiment of the invention, a polycrystalline ceramic-metal composite material is produced by the aforementioned methods, wherein the metal infiltration and oxidation rates are so controlled that the oxidation reaction of the parent metal is only partially completed, and unreacted metal remains in the final product. In this embodiment, alloying additives to the parent metal are provided according to the teaching of our copending application U.S. Ser. No. 818,943, now U.S. Pat. No. 4,713,360 such that desired changes to the physical properties of the unreacted metal, and hence the final composite article, are obtained.

DETAILED DESCRIPTION OF THE INVENTION AND THE PREFERRED EMBODIMENTS

In accordance with the present invention, a self-supporting polycrsytalline ceramic article is produced by controlling the rates of infiltration of the filler by molten parent metal and by the oxidation reaction between the molten metal and vapor-phase oxidant. The formation of the oxidation reaction product takes place on the surface of the individual filler particles leaving access channels for the vapor-phase oxidant such that at any given time the oxidation reaction is taking place through or within a substantial volume of the inter-particle pore volume of the filler. The molten parent metal wets the filler particles and infiltration occurs rapidly relative to the oxidation reaction. The total pore volume of the permeable filler mass is sufficient to accommodate the infiltrating metal and the vapor-phase oxidant.

The infiltrating molten metal forms a film around the filler particles. The product of the oxidation reaction forms at the interface between the infiltrated molten metal and the vapor-phase oxidant. The product grows in two opposite directions with respect to the orientation of the interface at any given point, namely, "outward" into the vapor phase within the inter-particle pore volume, and "inward" into the molten metal film. The "inward" growing reaction product is believed to dissolve in said metal until saturation is achieved, at which point the product precipitates from the saturated solution.

Figure 1:
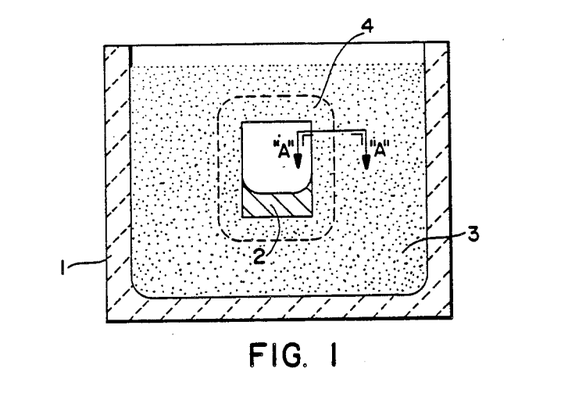
FIG. 1 is a cross-sectional elevation of a reaction vessel in which the process of the invention may be carried out.
Figure 2:
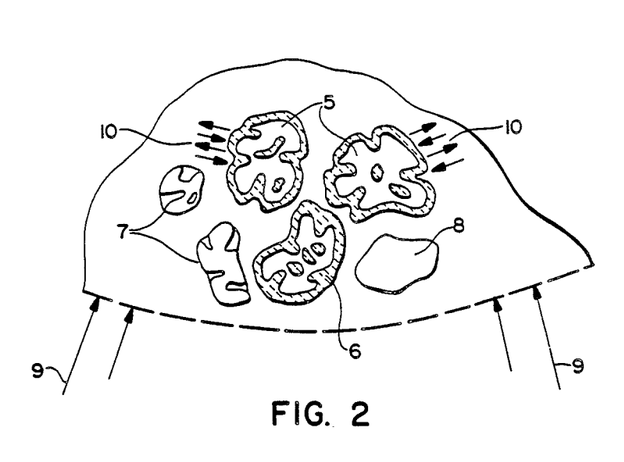
FIG. 2 is a section on Line A—A of FIG. 1 through a portion of the partly infiltrated filler greatly magnified for clarity to show the various phases present.

The foregoing can be readily understood by reference to the attached FIGS. 1 and 2. FIG. 1 represents a schematic cross-section through an apparatus in which the process of the invention is in progress. A parent metal piece 2 having any convenient size and shape is embedded in a bed of unbonded filler particles 3 maintained in a vessel 1. Said vessel is heated to above the melting point of the parent metal, part of which has infiltrated into the filler. The hatched portion of the metal piece 2 indicates molten metal remaining in its original location. The broken line 4 represents the approximate boundary of metal infiltration into the filler.

FIG. 2 represents a section along the line A—A on FIG. 1 across the boundary 4, greatly enlarged for clarity. Filler particles are represented by 5, 6, 7, and 8 and the direction of flow of the vapor-phase oxidant by the long arrows, 9.

A film of infiltrated molten parent metal has formed around the particles 5 and 6 (but not 7 and 8) as shown by the hatched peripheral band around said particles within the inter-particle pore volume. Parent metal has infiltrated the intra-particle pore volume of particles 5 (but not 6 and 7) as indicated by the hatching therein. Particle 8 is fully dense, i.e. has no intra-particle pore volume.

Short arrows 10 indicate the respective directions of "inward" and "outward" growth of the oxidation reaction product at the interface of the molten parent metal with the vapor-phase oxidant. It is evident that these directions vary according to the orientation of the interface at any given point.

It is evident from the foregoing that there is no planar reaction front, and that said reaction takes place within a substantial portion of the inter-particle pore volume of the infiltrated filler.

The improvement over the prior art and a significant aspect of this invention resides in the concept of controlling the pore volume of the network of pores or channels within the permeable filler mass. These pores need to be large enough so that as the film of molten parent metal flows along the surface of the particles comprising the permeable filler mass, the interconnected channels are not totally filled by parent metal. Optionally, there may be smaller (intra-particle or inter-particle) porosity which is filled by the metal. In order for the formation of the oxidation reaction product to take place substantially throughout the metal infiltrated portion of the filler, the large porosity needs to be distributed uniformly. As oxidation reaction continues, the channels are progressively filled by oxidation reaction product which also contains small pores. New parent metal then fills the newly formed small pores and the process continues until a substantially dense microstructure is produced.

The permeable filler may comprise any of the following:

(1) a lattice arrangement of bodies such as rods, bars, wires, plates, and tubes, (2) particle aggregates, including a bed of spheres, powders, and other particulates, including platelets, whiskers, and tubules, (3) continuous or discontinuous fiber bodies such as fibers, fiber bundles or tows, woven cloth, random fiber bodies, such as felt, (4) reticulated structures including porous bodies, sponges and/or foams.

In all of the above cases, the porosity in the filler body is typically characterized by the distribution of pore sizes. In the following description only particulate aggregates will be discussed as representative of the other filler geometries.

Filler particles may be pore-free or may contain pores. Particles which contain pores may be inherently porous. Alternatively, they may comprise an agglomerate of smaller particles or crystallites which may or may not be equiaxed. Such non-equiaxed smaller particles may comprise whiskers, wires, platelets, or the like. Intra-particle porosity in agglomerates comprises the spaces between the crystallites or smaller particles comprising the agglomerates.

Parent metal fills the small intra-particle porosity, and interconnected empty channels are formed between the coarse agglomerates. If the filler is comprised of pore-free particles, these need to be sufficiently large so that the inter-particle channels can accommodate both the wetting metal film and the oxidizing gas.

The filler geometry is one of the critical factors which controls the relative rates of infiltration by the parent metal and the oxidation reaction. The rate of oxidation reaction is related to the total surface area of the gas-metal contact, the rate of transport of the vapor-phase oxidant through the permeable filler mass to the metal infiltrated portion of it, and the rate of transport of the parent metal through the infiltrated portion of the filler.

The metal either flows as a film along the surface of non-porous particles or fills the inter-particle porosity and the initial total surface area of the gas metal contact available for the oxidation reaction is equal to the inter-particle surface area of the infiltrated portion of the filler. That reaction surface area increases as the filler particle size decreases, up to the point where the inter-particle spaces are so small that they are totally filled by the film of the infiltrating parent metal. In such a case, reaction surface area decreases drastically and a metal matrix composite is formed. Up to that point increase in the reaction surface area tends to increase the oxidation reaction rate and the volume fraction of the oxidation reaction product.

The rate of transport of the vapor-phase oxidant through the permeable mass of filler is related to the total pore volume and pore size distribution in the non-infiltrated portion of the filler, and the residual inter-particle porosity in the infiltrated portion. Increase in the pore size and pore volume increase the gas permeability of the filler mass, allowing increased access of vapor-phase oxidant and thus increase reaction rate, when such transport is rate controlling.

The rate of advance of the infiltrated zone of the filler mass is limited either by rate of flow of the metal through the filler or the wetting conditions at the edge of the zone in contact with the non-infiltrated portion. The parent metal is transported by flow through the intra-particle porosity of the filler or along the surface of the particles. Increase in the intra-particle porosity volume and/or decrease in the inter-particle pore volume increases the path available for the metal flow and thus may increase the infiltration rate.

Choice of appropriate pore size and shape distribution within the filler mass permits the control of the respective infiltration and oxidation rates, allowing tailoring of the resultant microstructure. In the ideal case, the advance of the infiltrated zone into the filler mass takes place at a rate which allows complete filling of the inter-particle pore volume by the oxidation reaction product. Porous structures can be obtained when faster parent metal infiltration occurs.

The suitable intra-particle pore sizes which allow for total filling of particles by parent metal are less than 20 $\mu$m and preferably below 5 $\mu$m. The suitable transverse dimension of inter-particle pores which permit maintenance of a network of vapor-phase oxidant access channels are more than 20 $\mu$m, and up to 100 $\mu$m in some cases. These preferred pore sizes are achieved by choosing the appropriate aggregate particle size and particle porosity. Typically particles 20 to 2000 $\mu$m in diameter are suitable. The intra-particle porosity depends on the characteristics of the particle, ranging from 0 for the pore-free particle, to nearly 98% for sponge or reticulated foam structures. Porosity of agglomerate particles of equiaxed grains ranges between 40-60% and in case of non-equiaxed whiskers 60-90% intra-particle porosities are achievable. Typically a particle of a maximum porosity, having an intra-particle pore size less than 5 $\mu$m is preferred.

Filler media having intra-particle pore volume are preferred when oxidation reaction of a major portion of the parent metal and a small filler particle size are both required. Such small particle size aids development of good mechanical properties of the finished component. In this preferred embodiment reaction product may be formed in both inter-particle and intra-particle pore volume by the respective "outward" and "inward" growth processes described hereinabove. The intra-particle pores normally influence mechanical properties of the finished component.

The filler may, if desired, comprise a packed bed of loose, unbonded particles. Alternatively, the particles can be bonded together to a permeable rigid preform which may have the size and shape of the desired composite end product.

As stated hereinabove, further means may be used, if desired, according to the present invention to control the rate of infiltration of the molten parent metal into the filler and the rate of oxidation of the metal.

The rate of infiltration of molten parent metal into the filler may be additionally controlled by the application of increased or decreased hydrostatic pressure acting on the metal. Hydrostatic pressure may be increased by applying gas pressure to the molten surface of the parent metal body. Alternatively, a riser filled with molten parent metal may be positioned above and in communication with the body. Either of the latter means increases the rate of infiltration. Hydrostatic pressure may be decreased by positioning the parent metal body below the filler mass so that capillary forces are opposed to gravitational forces. By this means, the rate of infiltration is decreased, and the amount of parent metal filling inter-particle channels is reduced.

The rate of oxidation reaction of the parent metal may be additionally controlled by controlling the pressure of the vapor-phase oxidant. The effect of reducing the partial pressure of the vapor-phase oxidant is to decrease the rate of oxidation reaction. Conversely, the effect of increasing the partial pressure is to increase the rate of reaction. Partial pressure may be reduced by diluting the oxidant with an inert gas, and this would have the effect of reducing the oxidation rate. When the vapor-phase oxidant is oxygen, a preferred gas diluent is nitrogen. When the oxidant is nitrogen, argon is a preferred diluent.

Reduction in pressure may be also achieved by:

(a) placing the apparatus of the invention in a chamber connected to a vacuum pump and pumping down to a low pressure, or (b) placing said apparatus in a sealed vacuum-tight chamber wherein the vapor-phase oxidant is consumed during the oxidation reaction by formation of an oxidation reaction product, and the pressure is controlled by admitting additional vapor-phase oxidant at a controlled rate.

Alternatively, to accelerate the rate of oxidation reaction, said pressure may be increased by placing the apparatus in a pressure chamber connected to suitable means for raising the pressure above atmospheric.

According to the invention, the preferred range of partial pressures of vapor-phase oxidant to achieve the desired increase or decrease in the rate of oxidation reaction is 0.01 to 2 atmospheres. Higher pressures can be achieved in specially designed hot isostatic pressing chambers and may be useful to increase the fraction of oxidation reaction product formed by growth "inward" into the metal.

As already disclosed in our Commonly Owned Patent Applications and Patents, the rate of oxidation reaction of the molten parent metal may be accelerated by provision of a suitable dopant material. Such dopant may comprise an alloying element added to said metal. Alternatively, it may comprise a coating material interposed between said metal and the filler. Dopant materials in particulate form may be introduced to the filler mass by, for example, mixing with the filler particles. Alternatively, dopant may be introduced to the filler in the form of a coating applied to the surfaces of the filler particles.

Some dopants act by disrupting the integrity of the ceramic portion of the oxidation reaction product, thus increasing the rate of the oxidation reaction. Others affect the wettability of either the filler or the oxidation reaction product by the parent metal and thus control the metal infiltration rate.

A further aspect of the present invention is directed to the production of polycrystalline composite material comprising an oxide matrix produced by reaction of a parent metal with oxygen, air or oxygen-containing gas mixtures, and a filler material embedded by this matrix.

The entire range of parent metals and filler materials suitable for use with the oxygen-containing vapor-phase oxidant has been disclosed in the Commonly Owned Patent Applications and Patents. This particular aspect of the present invention will be illustrated by the case of aluminum parent metal and particulate alumina filler.

The effects of the parent metal alloy composition, temperature, oxidant gas composition and the alumina filler particle size have been studied. It has been established that when growing into filler mass under certain conditions, substantially porous structures can be produced, bonded together by a relatively thin film of oxide matrix, leaving channels for access of vapor-phase oxidant into a substantial portion of the infiltrated portion of the filler bed. Changes in the above-mentioned process parameters result in changes in the product microstructure, in some cases producing substantially dense, pore-free composite material. The parent metal and oxidant gas compositions have the dominant effects in changing the product porosity. Aluminum parent alloys containing more silicon alloying additive tend to exhibit denser microstructures than those containing less silicon for a given oxygen content of the oxidant. Further, the reduction of the oxygen content of the vapor-phase oxidant also reduces the oxidation reaction rate and leads to a substantially more porous microstructure. Change in the temperature also affects the oxidation reaction rate, going through a maximum rate at an optimum temperature. Micro-structures with a minimum porosity are produced at the temperatures at or close to the optimum. The temperature also affects the relative proportion of oxide and metallic phases in the matrix. A smaller particle size of the filler also reduces the oxidation rate slightly but the effect is less pronounced than that of the oxygen partial pressure. This aspect of the invention is illustrated in Example 1.

A further aspect of the present invention is directed to the production of polycrystalline materials comprising a nitride matrix produced by the reactive nitridation of a parent metal using a vapor-phase nitridation agent, said matrix embedding a filler material.

The sequence of events required for such reactive nitridation is similar to that described hereinabove, namely, that the relative rates of parent metal infiltration into said filler and said reaction are such that, at any given time, said reaction is taking place throughout a substantial volume of the infiltrated portion of said filler.

Preferred parent metals include silicon, aluminum, titanium, zirconium, hafnium, etc. When the parent metal is silicon, the preferred fillers are silicon nitride, aluminum nitride, and titanium nitride. Suitable non-nitride fillers include, among others, silicon and titanium carbides. When the parent metal is aluminum, aluminum nitride, alumina, silicon carbide, titanium carbide, and boron carbide are examples of the materials suitable as filler components. Materials having the same nitridation reaction product as the filler material are commercially desirable. This results in a material having a single ceramic phase, optionally with some residual unreacted parent metal. Examples of such single ceramic phase composite products include silicon nitride matrix with a silicon nitride filler, and an aluminum nitride matrix with an aluminum nitride filler. Alternatively, inert fillers can be used to enable tailoring of particular composite properties. For this purpose, mixtures of filler materials of different chemical composition as well as mixtures of different filler particle sizes and particle and crystallite geometries can be useful. For example, a preform of silicon carbide fibers in a mixture of equiaxed porous agglomerate particles consisting of silicon carbide whisker crystallites can be embedded in a silicon nitride nitridation reaction product.

As disclosed hereinabove with general reference to oxidation reaction, the relative amounts of nitrided and un-nitrided parent metal in the matrix of the composite product can be controlled by selection of appropriate filler materials having a suitable pore volume.

Unless further steps are taken, however, the foregoing procedure alone may not result in any infiltration or growth of the nitride ceramic matrix. This is due to the fact that minor contamination of the filler or the nitriding atmosphere by either oxygen or oxygen-bearing compounds such as water vapor, may interfere with either the infiltration of the filler and/or nitridation of the parent metal. Steps which need to be taken to avoid contamination and/or to remove the already present contaminants are detailed below and constitute a significant improvement over the state-of-the-art procedure.

The contaminants, which can be present in the filler mass, the parent metal, or in the nitriding atmosphere, either prevent wetting of the filler mass by the parent metal or cause the formation of a passivating impermeable coating on the surface of the molten parent metal body. The most common deleterious contaminants of the filler mass are the oxygen and water vapor adsorbed to the surface of the filler particles or incorporated into the filler via hydrolysis reaction.

Although the mechanism by which oxygen and water vapor interfere with the reaction is not yet fully elucidated, it is at present hypothesized that in the case of silicon parent metal and silicon nitride filler, a silica-rich surface forms by either the adsorption of oxygen or by hydrolysis reaction. The resulting silica surface is less wettable by silicon alloys than is pure silicon nitride, and under nitridation process conditions prevents the infiltration of molten metal into the filler. When oxygen and water vapor are present in the nitriding atmosphere, they again interfere with the reaction. These contaminants react with both parent metal and the filler and interfere with the wetting and progress of the nitridation reaction. There are several possible sources of oxygen-bearing compounds. These include (1) residual content in the nitriding gas; (2) exhausted capacity or saturation of the drying column or oxygen-gettering compounds used to clean up the gas flow; (3) incomplete removal of air from the furnace insulation by either purging or by evacuation and back filling with nitriding gas; (4) desorption of oxygen or water from the surface of the insulation of the nitriding furnace; (5) volatile oxide or sub-oxide species evolving from oxide furnance refractories or other oxide furnace components by straight evaporation, e.g. $B_2O_3$, or by partial reduction by contact with carbon furnace components or with parent metal vapors. Even carbon monoxide, one of the least effective oxidizing compounds, can be further reduced by molten parent metal, e.g. leading to formation of solid metal carbide and an oxide as a volatile sub-oxide. The formation of these solid carbides on the surface of the molten parent metal has been observed and may impair the ability of molten metal to flow and infiltrate the filler.

How much of the trace contaminants need to be removed to allow the formation of the nitride reaction product varies depending on the particular parent metal/filler mass combination, its affinity for oxygen and/or hydrolysis, and the relative wetting behavior of the oxide and the nitride with respect to the parent metal. For example, aluminum nitride is very readily oxidized and hydrolyzed to form an alumina surface layer. Both alumina and aluminum nitride, however, can be quite readily wetted by an aluminum-magnesium parent alloy, and this system is tolerant of low levels of oxygen contamination--unless the levels are high enough to form an oxide bag over the parent alloy, preventing the alloy from flowing. For example, a nitrogen gas stream containing 8 ppm of oxygen and 250 ppm water acts as an effective nitriding agent leading to formation of aluminum nitride matrix composites. However, oxygen contamination at 1% level results in no nitridation or filler infltration.

The permissible levels of oxygen contamination in the case of a silicon metal alloy and silicon nitride filler system have not yet been precisely determined, but appear to be lower than in the case of the aluminum-aluminum nitride system. This is thought to be due to a lower affinity of silicon alloys to wet the silica-contaminated surface of silicon nitride.

Oxygen and/or moisture may be present as impurities in commercial grade nitrogen gas. Therefore, if nitrogen gas is to be used as a constituent of the vapor-phase nitridation medium, only the high purity grade should be used in which the above-mentioned impurities are present in very small amounts. Deleterious contaminants may also be present in the molten parent metal. Typical examples for silicon parent metal and silicon nitride filler are boron and aluminum. Both of these elements have nitrides more stable than silicon nitride, and when they are present in sufficiently high concentration in the parent alloy, they form their own nitrides from a layer on top of the parent metal, thus retarding the formation of silicon nitride. Aluminum, in concentrations above 1%, tends to react with the $Si_3N_4$ filler, reducing it to silicon and forming aluminum nitride instead of $Si_3N_4$. Aluminum does not seem to affect the wetting behavior of the silicon-silicon nitride system and the infiltration of the filler still takes place to the extent limited by the formation of the aluminum nitride skin on the parent metal. Aluminum concentrations below 1% in silicon do not result in any catastrophic effects. Metallurgical grade silicon, which contains approximately 0.5% aluminum, is a very suitable parent alloy, and aluminum contamination introduced by melting the silicon ingots in alumina crucibles does not seem to affect the progress of the reaction. Boron, however, has a much more deleterious effect. It affects wetting in a silicon-silicon nitride system and prevents infiltration of the filler by molten metal. With no effective contact between the filler and the parent alloy, the filler is not attacked by the exchange reaction, but rather a boron nitride passivating skin forms on the molten parent alloy.

Surface contamination of the filler by oxide contaminants can be removed by a high-temperature pre-treatment procedure. This can be done, prior to the formation of a filler bed or a preformed body, on the filler in a form of a loose aggregate. In this case, an efficient contact can be obtained between the pre-treatment environment and each filler particle by the flow of a nitriding or inert atmosphere or hydrogen gas through a fixed bed of filler or a fluidized bed arrangement. Care must then be taken during further storage, handling and forming operations to avoid re-contamination of the filler with moisture, atmospheric oxygen, or components of the binders used to form the green body. Alternatively, a permeable preformed filler body can be fabricated prior to the de-contaminating pre-treatment. Re-contamination can be minimized in this way, but the required duration of the pre-treatment can be extended because rate of contaminant removal is now limited by the permeability of the preform to the pre-treatment atmosphere and the diffusion of the contaminants out of the preform.

Removal of oxide contaminants from the surface of silicon nitride filler particles provides an example of the foregoing procedure. Silicon nitride is commercially available in a range of particle sizes. The larger particles, however, typically are porous agglomerates of individual crystallites of 1 to 10 microns in size. Equiaxed particles of 50 to 150 microns in size are preferred for use in the permeable filler bodies. As received from the manufacturer, these particles have surfaces contaminated by a silica layer formed by surface hydrolysis and adsorbed oxygen. When these particles are used directly as a filler in contact with silicon parent metal, metal infiltration does not take place initially, but only after several hours at a reaction temperature of 1550° C. to 1650° C. using an atmosphere of forming gas for vapor phase nitridation. Favorable wetting conditions are achieved after this time lapse and the metal infiltration and nitridation reaction begins.

It is preferable to eliminate the above incubation period by pre-treating the silicon nitride filler to remove surface contamination, rendering the surface immediately wettable by the molten parent metal. This pre-treatment is achieved in either a fixed bed or fluid bed reactor using the flow of a nitriding or inert atmosphere through the bed to fluidize it and to remove contaminants. The removal of such contaminants is assisted by vapor phase additives chosen so as to react with the silica surface layer to form volatile reaction products. Suitable additives are aluminum, silicon, and magnesium vapors, hydrogen, fluorine, chlorine, as well as hydrogen chloride and hydrogen fluoride. The first four of the above-mentioned additives are reducing agents which reduce the oxygen partial pressure in the atmosphere to the point where silica, $SiO_2$, decomposes into the volatile SiO. The other additives are oxidizing agents which, in conjunction with hydrogen in the atmosphere, react with the silica to form volatile $SiF_4$, $SiCl_4$ and oxyfluoride or oxychloride species. The removal of the volatile products can be further assisted by reducing the total pressure in the reactor with a mechanical pump. A vacuum of $1 \times 10^{-4}$ to $1 \times 10^{-5}$ atm. is usually sufficient for this purpose. A suitable temperature range for the pre-treatment is 1550° C. to 1800° C. Although higher temperatures accelerate the de-contamination, the upper temperature is limited by the decomposition of the silicon nitride filler. The time required for the de-contamination varies from one to up to five hours, depending on the temperature, pressure, and the gaseous additives. The treated powder should be stored and handled in an inert, dry atmosphere. Binders used for forming must also be oxygen-free to avoid recontamination. Hydrocarbons, such as paraffin, are suitable as binders.

A further alternative means of providing a porous oxygen-free nitride preform is to produce such a preform by in situ reaction of a precursor material. The precursor material can be metallic, and in some instances it may even have the same composition as the molten parent metal subsequently used in the reactive infiltration step. In this case, metallic powder, chopped fibers, wire, whiskers, or flakes are optionally mixed with inert filler material and the resulting mixture is formed into the desired shape using any conventional powder-forming technology. The preform is then reacted to form the desired compound, in such a manner as to retain its dimensions and porosity. The advantage of such a reaction bonded preform is that it can be arranged so that the parent metal is introduced in contact with the preform without ever exposing it to contact with air or other sources of contamination. For example, a reaction bonded silicon nitride preform can be made by nitriding a shaped body of silicon metal powder, using gaseous nitrogen, ammonia, or forming gas (nitrogen $-5\%$ hydrogen mixture) at a temperature of 1200°–1400° C. below the melting point of silicon. A solid silicon-silicon nitride skeleton is formed. The temperature is then raised above 1450° C. which melts the remaining silicon and accelerates the rate of nitridation. The preform so produced is free from oxygen contamination.

A yet further alternative of providing a porous oxygen-free nitride preform is to machine a bar of solid parent metal and a negative of the desired shape solid parent metal, and to bury the resultant metal preform in a loose inert filler bedding. Then in a first heating step, reaction conditions are set up which result in production of a porous composite microstructure. The porous product is then removed from the bedding and at that point has an internal cavity replicating the external shape of the original parent metal preform, and mechanical properties similar to a bisque-fired conventional ceramic green body. At this point, optionally, the exterior surface can be bisque machined to exact shape, under dry nitrogen atmosphere, by conventional bisque machining procedures, yielding a preform with defined exterior and interior surfaces, and minimum contamination. The preform is then infiltrated by the nitridation reaction product under the reaction conditions which are optimized according to the above-stated principles to yield substantially dense and pore-free microstructure.

As explained in the Commonly Owned Patent Applications and Patents, the addition of dopant materials is required in some instances to enable the ceramic-forming reaction to go forward in the desired progressive manner. In the process of the present invention, however, while dopants are not necessary to the reactive nitridation of silicon or aluminum parent metals, their addition to the molten parent metal or to the permeable filler body accelerates the nitridation reaction. For the nitridation of silicon parent metal, iron and copper have been found to be useful dopants. It is known in the literature (Boyer, S. M. and Moulson, A. J., "A Mechanism for the Nitridation of Fe-Contaminated Silicon," J. Mat. Sci., 1978, 13, pp. 1637-1646, and Dawson, W. M., Arundale, P., and Moulson, A. J., "Development and Control of Microstructure in Reaction Bonded Silicon Nitride," Sci. Ceram., 1977, 9, pp. 111-118) that iron accelerates nitridation of silicon. The method of the present invention has shown that both iron and copper play a similar role under the reaction conditions employed, although no references in the literature have been found regarding the beneficial aspects of copper. In the present invention, use of ingots of silicon-iron alloy and silicon-copper alloy containing up to 10% weight of the alloying element present in each case, results in increased amount of nitridation reaction at 1550° C. compared to the amount of reaction achieved with pure silicon under identical conditions. Even lower amounts of iron, from the 0.8% typically found in metallurgical grade silicon to alloys with 0.0018% iron, provide sufficient dopant activity to result in the same beneficial enhancement of nitridation.

Magnesium dopant is applicable to aluminum parent metal. Such dopants may be introduced either to the parent metal or the filler in the various ways already disclosed hereinabove.

In both aluminum and silicon parent metals, the benefits of dopants derive from faster reaction kinetics, less porous resulting microstructure and higher degree of conversion of the parent metal to the nitride ceramic matrix.

Conditions of the oxidation (or nitridation) reaction of the parent metal can optionally be directed to restricting the amount of reaction product, as already disclosed hereinabove. A metal matrix composite is thereby produced, the unreacted parent metal embedding the filler.

In a further aspect of the invention, the physical properties of the metal matrix, and hence of the final composite product, can be improved by addition of one or more selected alloying elements to the parent metal. Such elements may be selected to provide solid solution or precipitation strengthening of the metal, conversion of the metallic phase into high melting intermetallic compounds, or raising the melting point of the residual metal. When silicon is the parent metal and silicon nitride is the filler, the residual metal can be tailored by the addition of iron, copper, manganese, titanium, nickel, or calcium.

In the method of the present invention, the addition of said alloying elements to the filler body or to the parent metal can be used to tailor the composition of the residual metal in the final product, especially since these elements do not form nitrides, but end up as silicides or intermetallic phases in the metal. Such alloying additions may, if desired, be made directly to the parent metal. Alternatively, they may be incorporated as reducible compounds in particulate form in the filler.

Similarly, when the parent metal is aluminum and the oxygen is the vapor-phase oxidant alloying additions may be made in the form of one or more oxides of desired additive reducible by aluminum, for example, copper, silicon, or titanium oxides. Such oxides may be incorporated in the filler in particulate form. Alternatively, they may be fine ground, suspended in a suitable aqueous or organic medium and applied as a coating to the surfaces of the filler particles.

In yet a further embodiment of the invention, one or more barrier compounds may be incorporated in the filler as a layer which defines the outside surface of the required composite article. Such barrier compounds inhibit growth or development of the oxide reaction product beyond the barrier on being contacted by the infiltrating media.

Suitable barrier means may be any element, composition, or the like, which, under the process conditions of the invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. Suitable barrier means for use with silicon parent metal include alumina, silica and their compounds. Also suitable are non-volatile boron compounds such as boron nitride. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20-1000 or finer. Other suitable barriers include refractory ceramics or metal sheaths which are open on at least one end to permit a vapor-phase oxidant to permeate the bed and contact the molten parent metal.

As disclosed hereinabove, alumina and silica have been found to be suitable as barriers in the infiltration of filler preforms by silicon/silicon nitride matrix material. This is thought to work because alumina and silica are not wetted by the silicon parent metal. Alumino-silicate minerals such as Mullite or Kaolin may also be suitable as barrier materials. Oxides of other metals less noble than silicon and therefore not reducible by silicon may be used as barriers, e.g. oxides of alkali and alkali earth metals and their compounds with each other and with alumina and silica. The melting point of the oxide compound chosen as a barrier should be above the nitridation reaction temperature and, at this temperature, should not sinter to a dense body impermeable to gas.

As disclosed hereinabove, non-volatile boron compounds such as pure boron nitride may be employed as a barrier material to limit the region of infiltration and growth of silicon nitride. Boron affects wetting in the silicon-silicon nitride system and prevents the infiltration of the filler by the metal.

In a further embodiment, the present invention comprises the termination of nitridation reaction at will by the addition of a killer material to either the molten parent metal or to the gaseous atmosphere. In the case of silicon parent metal, metallic boron and volatile boron compounds comprising boron oxides, halides, or hydrides are suitable killer materials.

The action of the killer materials can be reversed by the addition of an element which forms very stable boride compounds. In the case of silicon parent metal, the addition of calcium or calcium compounds results in the resumption of the nitridation of the silicon parent metal. Elemental calcium may be added as an alloying additive to silicon parent metal at a concentration of about 10 weight percent, and/or as a calcium nitride addition, at about 10 weight percent, to silicon nitride filler material. The effect is attributed to the formation of calcium hexaboride solid precipitates which scavenge the boron from the parent metal alloy and reduce its concentration in the liquid solution to the point where BN formation is no longer favored and favorable wetting behavior dominates.

Once the contaminants which have a stopping or killing action on the oxidation reaction are identified and this action is understood, these contaminants can be used advantageously to control the oxidation reaction. The reaction can be stopped at a specific moment by the addition of the contaminant to the molten parent metal or to the gaseous atmosphere, then started again by the addition of an appropriate alloying additive.

EXAMPLE 1

A parent metal alloy based on commercial purity aluminum and containing 3% Si and 3% Mg was used to produce an aluminum oxide polycrystalline composite according to the process of the invention. Reaction temperature was 1250° C. and the filler comprised Norton "38 Alundum" aluminum oxide. The vapor-phase oxidant was oxygen.

Four tests were run using two levels of filler particle size and two levels of oxidant-partial pressure, with the following results.

|  | 1. | 2. | 3. | 4. |
|---|---|---|---|---|
| Oxidant | 100% oxygen | 100% oxygen | 10% oxygen 90% argon | 10% oxygen 90% argon |
| Filler | 200 μm substantially dense | 50 μm substantially dense | 200 μm | 50 μm |
| Microstructure | Pore free | Pore free | Porous | Porous |
| Reaction Rate | Fastest | Faster | Slower | Slower |

The effect on reaction rate of increasing oxygen partial pressure was significantly greater than that of increasing filler particle size. The order of increasing reaction rate of the flow tests may therefore be shown as follows:

| 4 | < | 3 | << | 2 | < | 1 |
|---|---|---|---|---|---|---|
| (slowest) | | | | | | (faster) |

EXAMPLE 2

A parent metal comprised of high purity silicon metal was used to produce a silicon nitride polycrystalline composite according to the process of the invention. Reaction temperature was 1650° C. and the filler comprised silicon nitride supplied by the Kema Nord Company. The vapor-phase oxidant was nitrogen.

Two tests were run: in one, the filler was as received material. This material consists of randomly shaped nearly equiaxed particles, 150-250 μm in size, each an agglomerate of fine crystallites 1-10 μm in size. The agglomerates are typically porous but the amount of porosity varies widely from particle to particle. In the other test, the as received material was milled prior to being used as the filler. The milling operating liberates the individual 10 μm crystallites from the agglomerates. Packing of these particles into a filler bed does not result in a network of coarse interconnected channels, rather only small inter-particle size exists. These particles were used as a filler bed packed around the silicon ingot.

Test results were as follows:

| Test | Filler | Time h. | Weight Gain (% of Theoretical Maximum | Matrix |
|---|---|---|---|---|
| 1 | 150-250 μm porous agglomerates | 16 | 62 | silicon nitride |
| 2 | 10 μm pore free crystallites | 48 | 38 | metal |

From the above, it is evident that, even with a time at reaction temperature three times as long, the composite produced in Test #2 using the fine filler contained significantly less oxidation reaction product, i.e., significantly more unreacted parent metal.

Figure 3:
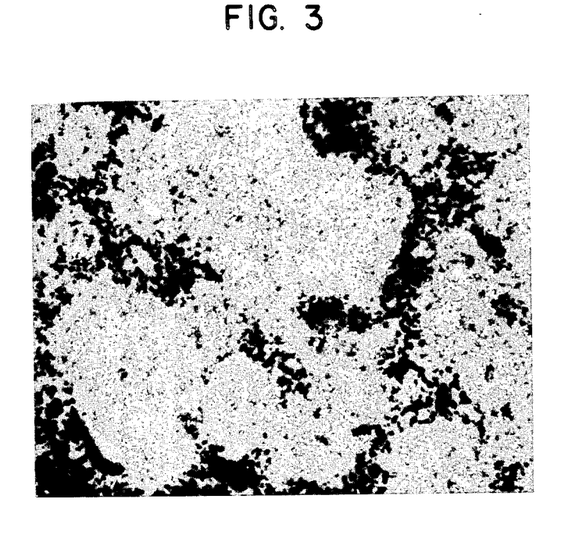
FIG. 3 is a photomicrograph of a polycrystalline composite obtained by the process of the invention in which the matrix is predominantly ceramic.

FIG. 3 is a photomicrograph at a magnification of 100 times of a sample of silicon nitride filler in the form of porous agglomerates of a sample taken immediately after completion of infiltration of molten silicon parent metal in Test #1. Gray areas indicate silicon nitride; white, unreacted silicon parent metal; and black, porosity. The original silicon nitride particles are evident as is the intra-particle pore volume into which silicon metal has infiltrated. Each particle is surrounded by a layer of dense silicon nitride reaction product. Porosity remains in the inter-particle pore volume.

Figure 4:
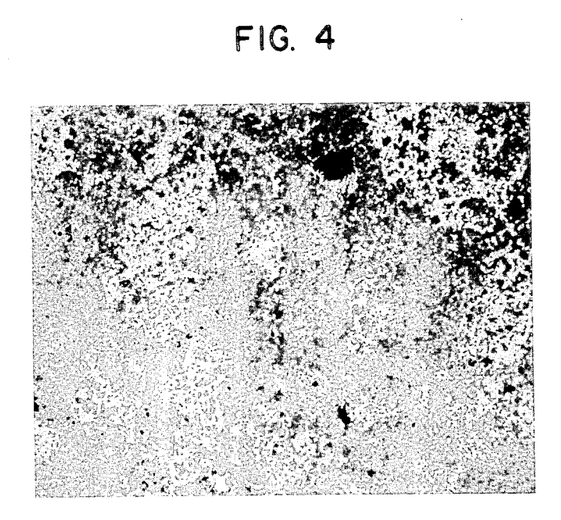
FIG. 4 is a photomicrograph of the composite structure of FIG. 3 immediately after the commencement of parent metal infiltration with the inter-particle channels partially filled by porous oxidation reaction product.

Figure 4 is a photomicrograph of the composite produced in Test #1 after completion of the nitridation reaction.

Figure 5:
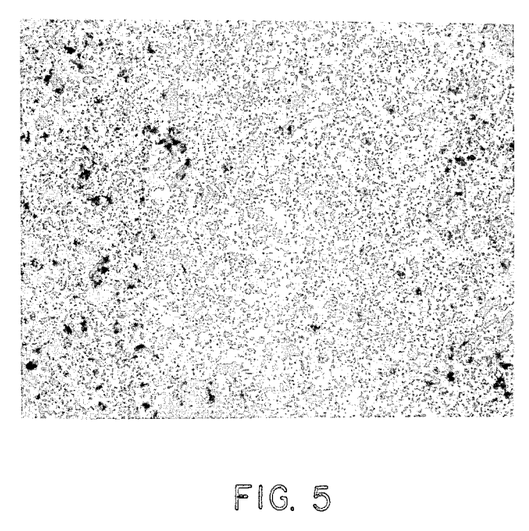
FIG. 5 is a photomicrograph of a polycrystalline composite obtained by the process of the invention in which the matrix is metallic.

Figure 5 is a photomicrograph of the composite produced in Test #2. Magnification of both photomicrograph is 100 times that of Figure 4. The original filler particles are still evident in the structures of both figures. Figure 4 shows that the inter-particle pores have become filled with silicon nitride reaction product to produce a substantially pore-free structure.

It is evident from Figure 5 that the attempt at reactive infiltration of this filler bed by molten silicon resulted in total filling of large volumes of the filler with metal, locally forming, spontaneously infiltrated metal matrix composite structure.

The following examples demonstrate the effect of added dopants on the nitridation of high purity silicon metal.

EXAMPLE 3

Silicon nitride polycrystalline composites were produced according to the process of the invention using the following parent metal alloys:
1. High purity silicon (Alfa grade 6 n
2. 90% high purity silicon: 10% iron dopant
3. 90% high purity silicon: 10% copper dopant Reaction conditions in each case was 1550° C. for 16 hours using 150-250 μm discrete agglomerate silicon nitride supplied by the Kema Nord Company as a filler.

Results were as follows:

| Test | Parent Metal | Weight Gain (% of Theoretical Maximum) |
|---|---|---|
| 1 | high purity Si | 65 |

-continued

| Test | Parent Metal | Weight Gain (% of Theoretical Maximum) |
|---|---|---|
| 2 | 90% Si–10% Fe | 85 |
| 3 | 90% Si–10% Cu | 75 |

From the foregoing it is evident that a significant increase in the weight gain, i.e., extent of nitridation of the silicon metal, was associated with the use of copper and iron as dopant materials.

What is claimed is:

1. A method of producing a composite comprising a self-supporting polycrystalline material obtained by the oxidation reaction of a molten parent metal with a vapor-phase oxidant comprising providing control of infiltration of a molten parent metal into a permeable mass of filler material and in situ oxidation of the molten parent metal with a vapor-phase oxidant in the permeable mass of filler material, said control being sufficient to provide a predetermined relative proportion of oxidized to non-oxidized parent metal within the composite, by:
   (a) selecting a parent metal comprising at least one material selected from the group consisting of zirconium and hafnium, and selecting a permeable mass of filler material exhibiting interparticle pore volume;
   (b) heating said parent metal in the presence of a vapor-phase oxidant at a temperature above its melting point to form a body of molten parent metal, and contacting the resulting molten metal body with said permeable mass of filler material;
   (c) maintaining said temperature for a time sufficient to permit (i) infiltration of said filler material by said molten metal and (ii) oxidation reaction of said molten metal with said vapor-phase oxidant, under conditions which control the rate of infiltration of said metal and the rate of said oxidation reaction such that the oxidation reaction which occurs between said molten parent metal and said vapor-oxidant is effected inside of the infiltrated mass of filler material within at least a portion of the interparticle pore volume such that the oxidation reaction product formed inside of said mass, together with any unoxidized portion of the parent metal provides a matrix embedding the material; and
   (d) recovering said composite.

2. A method according to claim 1 wherein said permeable mass of filler exhibits intra-particle pore volume and formation of parent metal oxidation reaction product takes place within both the inter-particle pore volume and said intra-particle pore volume and said intra-particle pore volume of the infiltrated mass.

3. A process according to claim 2 wherein the total porosity of the filler particles is within the range about 20% to about 80% by volume.

4. A process according to claim 3 wherein said filler is comprised of a packed bed of unbonded particles.

5. A process according to claims 1 or 2 wherein said filler is comprised of a packed bed of unbond particles.

6. A process according to claim 5 wherein the unbond particles are in the form of whiskers, rods, or platelets.

7. A process according to claims 1 or 2 wherein the filler is comprised of a preform of bonded particles.

8. A process according to claim 7 wherein the filler is comprised of a sponge-type structure.

9. A process according to claims 1 or 2 wherein hydrostatic pressure is applied to said molten parent metal body during step (C) for the purpose o controlling said rate of infiltration.

10. A process according to claim 9 wherein said pressure is incresed by application gas pressure to said body for the purpose of increasing the rate of infiltration.

11. A process according to claim 9 wherein said pressure is increased by a column of molten parent metal in a riser communicating with said body, said metal in said riser having a surface higher than the surface of said body.

12. A process according to claim 9 wherein said hydrostatic pressure is decreased to less than 1 atmosphere for the purpose of decreasing said rate of infiltration.

13. A process according to claim 12 wherein said decrease is applied by positioning said body beneath the filler in contact therewith, such that gravitational and capillary forces are in opposition.

14. A proces according to claims 1 or 2 wherein the partial pressure of said vapor-oxidant is reduced to about 0.1–1 atmosphere.

15. A process according to claim 14 wherein said reduced partial pressure is achieved by diluting said oxidant with an inert gas.

16. A process according to claim 15 wherein said gas comprises argon.

17. A process according to claim 14 wherein said reduced partial pressure is achieved by carrying out said process in a sealed chamber wherein said oxidant is consumed during said oxidation reaction by formation of a solid reaction product, and admitting said oxidant at a controlled rate into said sealed chamber.

18. A process according to claims 1 or 2 wherein the partial pressure of said vapor-phase oxidant is increased by carrying out said process in a pressure vessel provided with means for rising said pressure to about 1–2 atmospheres.

19. A process according to claim 22 wherein said dopant is applied as a coating on at least a portion of said parent metal surface and positioned between said surface and said filler.

20. A process according to claim 22 wherein said dopant is applied in particulate form admixed with said filler.

21. A process according to claim 22 wherein said dopant is suspended in a aqueous or organic liquid medium and said suspension is applied as a surface coating to the particles of said filler.

22. A process according to claims 1 or 2 wherein a dopant material is introduced into the zone of said oxidation reaction to promote said reaction.

23. A process according to claim 22 wherein said dopant is alloyed with said parent metal.

24. A process according to claim 1 or claim 2 in which said vapor-phase oxidant comprises a nitridation agent and said composite comprises parent metal nitride.

25. A process according to claim 24 wherein said agent comprises high purity nitrogen gas or a reactive compound thereof.

26. A process according to claim 24 in which, prior to said vapor-phase nitridation, said filler is treated with nitrogen gas, hydrogen, or an inert gas to remove occluded surface oxygen and/or moisture.

27. A process according to claim 26 wherein said treatment is carried out at about 1550°–1880° C. for a period of about 1 to 5 hours.

28. A process according to claim 26 wherein said filler comprises a nitride of silicon, aluminum, or titanium.

29. A process according to claim 24 wherein said composite comprises silicon nitride or aluminum nitride produced by vapor-phase nitridation of a porous body comprising silicon or aluminum precursor metals.

30. A process according to claims 1 or 2 wherein at least a portion of the parent metal is oxidized, and alloying additives are provided to alloy with the unoxidized portion of said metal to effect desired changes in the properties thereof.

* * * * *